United States Patent
Davidian et al.

(10) Patent No.: US 12,076,688 B2
(45) Date of Patent: Sep. 3, 2024

(54) METHOD AND FACILITY FOR PURIFYING A HIGH-FLOW GAS STREAM

(71) Applicant: L'Air Liquide, Societe Anonyme pour l'Etude et l'Exploitation des Procedes Georges Claude, Paris (FR)

(72) Inventors: Benoit Davidian, Champigny-sur-Marne (FR); Christian Monereau, Champigny-sur-Marne (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 446 days.

(21) Appl. No.: 17/432,898

(22) PCT Filed: Feb. 12, 2020

(86) PCT No.: PCT/FR2020/050252
§ 371 (c)(1),
(2) Date: Aug. 20, 2021

(87) PCT Pub. No.: WO2020/169899
PCT Pub. Date: Aug. 27, 2020

(65) Prior Publication Data
US 2022/0241717 A1 Aug. 4, 2022

(30) Foreign Application Priority Data
Feb. 21, 2019 (FR) .................... FR 1901734

(51) Int. Cl.
*B01D 53/04* (2006.01)
*B01D 53/047* (2006.01)

(52) U.S. Cl.
CPC ..... *B01D 53/0407* (2013.01); *B01D 53/0462* (2013.01); *B01D 53/047* (2013.01);
(Continued)

(58) Field of Classification Search
CPC ............ B01D 53/0407; B01D 53/0462; B01D 53/04; B01D 53/047; B01D 2253/104;
(Continued)

(56) References Cited

U.S. PATENT DOCUMENTS 3,873,287 A * 3/1975 Barnebey ........... B01D 46/0013
96/139
4,698,072 A * 10/1987 Rohde .................... B01J 8/0415
95/143

(Continued)

FOREIGN PATENT DOCUMENTS

DE 91 00 168 3/1991
EP 0 789 208 8/1997
(Continued)

OTHER PUBLICATIONS

International Search Report and Written Report for PCT/FR2020/050245, mailed May 15, 2020.
(Continued)

*Primary Examiner* — Frank M Lawrence, Jr.
(74) *Attorney, Agent, or Firm* — Justin K. Murray

(57) ABSTRACT

Certain embodiments of the invention relate to a method and facility for purifying a high-flow gas stream by absorption, the purification facility comprising at least one absorber having a parallelepipedal enclosure arranged horizontally and comprising: a gas stream inlet and outlet, two fixed-bed absorbent masses each having a likewise parallelepipedal shape, the surfaces of which are parallel to the surfaces of the enclosure, and a set of volumes allowing the traversing of the two absorbent masses by the gas streams, in parallel but opposite directions, the traversing occurring horizontally over the entire cross-section of each of the absorbent masses and over their entire thicknesses.

15 Claims, 8 Drawing Sheets

(52) U.S. Cl.
CPC .. *B01D 2253/104* (2013.01); *B01D 2253/108* (2013.01); *B01D 2257/404* (2013.01); *B01D 2257/504* (2013.01); *B01D 2257/702* (2013.01); *B01D 2257/80* (2013.01); *B01D 2259/40084* (2013.01); *B01D 2259/402* (2013.01)

(58) Field of Classification Search
CPC ........ B01D 2253/108; B01D 2257/404; B01D 2257/504; B01D 2257/702; B01D 2257/80; B01D 2259/40084; B01D 2259/402; B01D 2251/404; B01D 53/0446; B01D 2251/408; B01D 2253/102; B01D 2253/106; B01D 2257/708; B01D 2258/0258; B01D 2258/0275; B01D 2258/06; B01D 2259/40086; B01D 2259/4009; B01D 2259/4146; B01D 2259/4566
USPC ...... 95/96, 148; 96/121, 132, 143, 144, 151, 96/152
See application file for complete search history.

(56) References Cited

U.S. PATENT DOCUMENTS

| | | | |
|---|---|---|---|
| 5,176,721 | A | 1/1993 | Hay et al. |
| 5,735,142 | A | 4/1998 | Grenier |
| 6,059,863 | A | 5/2000 | Monreau et al. |
| 6,402,809 | B1 | 6/2002 | Monereau et al. |
| 9,358,496 | B2 | 6/2016 | Berges et al. |
| 2005/0217481 | A1 | 10/2005 | Dunne et al. |
| 2006/0210454 | A1 | 9/2006 | Saxena et al. |
| 2011/0146487 | A1* | 6/2011 | Celik ................. B01D 53/0407 96/121 |
| 2012/0058017 | A1 | 3/2012 | Furuyama et al. |
| 2012/0167622 | A1 | 7/2012 | Cognard et al. |
| 2017/0216760 | A1 | 8/2017 | Le Bot et al. |
| 2018/0126319 | A1 | 5/2018 | Ferstl et al. |
| 2019/0137174 | A1 | 5/2019 | Cavagne et al. |
| 2019/0282950 | A1* | 9/2019 | Naito .................... B01D 53/62 |
| 2022/0193598 | A1* | 6/2022 | Suter .................. B01D 53/0446 |
| 2022/0196326 | A1* | 6/2022 | Davidian ............. F25J 3/04866 |

FOREIGN PATENT DOCUMENTS

| | | |
|---|---|---|
| EP | 1 080 773 | 3/2001 |
| EP | 2 752 232 | 7/2014 |
| FR | 2 767 716 | 3/1999 |
| FR | 2 949 846 | 3/2011 |
| FR | 2 981 280 | 4/2013 |
| FR | 3 052 242 | 12/2017 |
| JP | 3 065 534 | 7/2000 |

OTHER PUBLICATIONS

French Search Report and Written Opinion for FR 1 901 731, mailed Dec. 4, 2019.
International Search Report and Written Report for PCT/FR2020/050253, mailed May 15, 2020.
French Search Report and Written Opinion for FR 1 901 732, mailed Oct. 14, 2019.
International Search Report and Written Report for PCT/FR2020/050252, mailed May 13, 2020.
French Search Report and Written Opinion for FR 1901734, mailed Nov. 20, 2019.

* cited by examiner

METHOD AND FACILITY FOR PURIFYING A HIGH-FLOW GAS STREAM

CROSS REFERENCE TO RELATED APPLICATIONS

This application is a § 371 of International PCT Application PCT/FR2020/050252, filed Feb. 12, 2020, which claims the benefit of FR1901734, filed Feb. 21, 2019, both of which are herein incorporated by reference in their entireties.

FIELD OF THE INVENTION

The invention relates to a method and to an installation for the low-pressure purification of a high-flow gas stream, i.e. from a few thousand to a few tens of thousands of $Nm^3/h$. More specifically, this relates to the purification of a gas through a guard bed or the separation/purification of a gas fluid by a TSA cycle, or even in some cases by quasi-isobaric PSA cycles.

BACKGROUND OF THE INVENTION

In all these cases, an adsorption phenomenon is implemented, whether this phenomenon is reversible (physisorption) or irreversible (chemisorption).

In general, a gas phase adsorption method can be used to separate one or more molecules from a gas mixture containing said molecules, by utilizing the difference in affinity of one or more adsorbents for the different constituent molecules of the mixture. The affinity of an adsorbent for a molecule depends, on the one hand, on the structure and the composition of the adsorbent and, on the other hand, on the properties of the molecule, particularly its size, its electronic structure and its multipole moments. An adsorbent can be, for example, a zeolite, an activated carbon, an optionally doped activated alumina, a silica gel, a carbon molecular sieve, an organometallic structure, an alkaline or alkaline-earth metal oxide or hydroxide, or a porous structure preferably containing a substance capable of reacting with the molecules, such as amines, physical solvents, metal complexing agents, metal oxides or hydroxides, for example.

The more conventional adsorbent materials are in the form of particles (beads, rods, crushed materials, etc.), but they can also be found in structured form, such as monoliths, wheels, parallel passage contactors, fabrics, fibers, etc.

There are 3 main families of adsorption methods: sacrificial load methods, TSA (Temperature Swing Adsorption) methods and, finally, PSA (Pressure Swing Adsorption) methods.

In sacrificial load methods, the term "guard beds" is often used in this case, a new load is introduced when the load being used is saturated with impurities or, more generally, when it can no longer adequately fulfil its role of protection. Unlike the regenerative methods (TSA, PSA), the material of the load can irreversibly attach the impurities.

In TSA type methods, the adsorbent, at the end of use, is regenerated in situ, i.e. the captured impurities are discharged so that said adsorbent recovers most of its adsorption capabilities and can restart a purification cycle, with the main regeneration effect being due to an increase in temperature.

Finally, in PSA type methods, the adsorbent, at the end of the production phase, is regenerated by desorption of the impurities, which is achieved by means of a drop in their partial pressure. This pressure drop can be achieved by a drop in the total pressure and/or by flushing with a gas devoid of or with few impurities. It is only this latter case that is of interest here in the field of PSAs. More specifically, it then involves transferring a constituent of a fluid into another equivalent, or even greater, flow. It can involve, for example, recovering a product with a high economic value contained in a waste gas that is transferred into a method gas. The adsorption and regeneration pressures then can be close.

A guard bed is simply passed through by the fluid to be purified. In order to best use the active material, said material is often housed in two adsorbers operating in series, with the second adsorber containing the front zone, whereas the first adsorber is virtually saturated. Before the impurity penetrates, the load of the first adsorber will have been replaced by a new load and a set of valves will invert the order of circulation of the load in the adsorbers. Thus, the best use is made of the active material.

Conventionally, a TSA method cycle comprises the following steps:

a) purifying/separating the fluid at super-atmospheric pressure and at ambient temperature by circulating through the adsorbent mass;

b) depressurizing the adsorber to atmospheric pressure;

b) regenerating the adsorbent by circulating a gas heated to a temperature usually ranging between 60 and 250° C. by means of an exchanger that is generally of the electric heater or steam heater type;

d) cooling the adsorbent at ambient temperature, in particular by continuing to introduce said non-heated regeneration gas therein;

e) repressurizing the adsorber with the gas to be purified/separated or by the treated gas.

Additional steps to those described above can be added, such as a step of placing the two adsorbers in parallel, with a varying duration, i.e. from a few seconds to several minutes, or even a step of waiting without fluids circulating through the adsorbent, for example, at the end of the regeneration step.

Generally, TSAs comprise two adsorbers, operating alternately, i.e. one of the adsorbers is in the production phase, while the other is in the regeneration phase. Numerous other configurations can be used according to the applications (plurality of adsorbers, closed-loop or semi-closed loop regeneration, heating and cooling in series on different adsorbers, etc.). These implementation choices do not form part of the features that are specific to the present invention and that, for their part, will be explained below.

With the pressure helping to stop impurities, at least in the case of physisorption, the purification unit is very generally installed on a gas that has been previously compressed. For example, to date, the purification of the air that is intended to be divided in a cryogenic unit almost exclusively occurs under pressure, although a certain number of variants have been proposed. The cryogenic cycle most often used is the "dual column" cycle, in which the air is compressed at a single pressure, which corresponds, to the nearest pressure losses, to the operating pressure of the column, called average pressure, i.e. generally between 4.5 and 6 bar abs. The purification is generally carried out at this pressure.

Indeed, the implementation of a low-pressure adsorption method, in the vicinity of the atmospheric pressure, raises a certain number of problems in relation to a medium- or high-pressure method (>10 bar abs). The adsorbent mass to be used is substantially higher due to the partial pressures of the impurities that are substantially lower and thereby also substantially lower adsorption capacities. The pressure losses are also substantially greater at the same geometry and the corresponding consumed energy can be high enough to make the contemplated method ineffective. It will be understood that these problems are much more troublesome the higher the flow rates of the fluids that are used.

Therefore, different solutions have been proposed to overcome these disadvantages.

A first basic tendency has been to develop adsorbers with a minimum restraint on the circulation of fluids. The use of adsorbent with a thin film and with a large flow section is one of the solutions that is generally used, irrespective of the type of adsorber (cylindrical with a vertical axis, with a horizontal axis, a radial axis, etc.); however, such a selection has disadvantages.

As schematically shown in [FIG. 1], such an arrangement results in large dead volumes on either side of the adsorbent volume. Diagrams 1A, B respectively show cylindrical adsorbers with a vertical and horizontal axis. [FIG. 2] for its part shows a radial adsorber. The adsorbent volumes, when they are used in thin layers, represent only a fraction of the total internal volume of the adsorber, generally less than 50%. This fraction tends to decrease when the size of the adsorbers is increased. A portion of these dead volumes is required to ensure good distribution of the fluids through the adsorbent volume. This also requires particularly low filling tolerances in order to have adsorbent layers with the same thickness and density (or even void fraction), irrespective of the path of the fluids through the adsorbent, in order to avoid any bypass that would pollute the production before the end of the purification step.

It is to be noted that, in the case of radial beds, it is possible to obtain, by virtue of the implementation of the concentric cylindrical grids, bed thicknesses that are practically identical to the nearest manufacturing tolerances. However, in the case of cylindrical adsorbers with a vertical or horizontal axis, it is worthwhile having very flat free surfaces after filling and ensuring that they thus remain in operation. On sections that can exceed 10 m2, this requires suitable procedures.

If the cylindrical adsorbers can be filled in a relatively efficient and homogeneous manner due to their geometry, it is not always the case with the radial beds, for which equipment generally needs to be used that is specially developed for this purpose and/or equipment with a detachable upper part needs to be provided.

A final approach for reducing pressure losses, i.e. ultimately to have a large flow section for the fluids and low bed thicknesses, involves dividing the adsorbent mass corresponding to an adsorber into a plurality of sub-systems operating in parallel.

Several possibilities then emerge. The adsorbent mass is divided, but is located in the same pressure-resistant enclosure. [FIG. 7] and [FIG. 8] of document EP 2752232 illustrate this case. A cylindrical ferrule contains two identical adsorbent beds on either side of a central zone used here as a gas inlet, with half of this gas, after purification, exiting laterally toward each of the beds. Such an arrangement allows the flow section to be approximately doubled, allows the width of the beds to be reduced, but as a result of the geometry creates distribution defects that are not compatible with the performance required for air purification before cryogenic separation.

A plurality of identical modules also can be implemented that are connected together and for this reason operate as one and the same adsorber.

By way of an example, reference can be made to [FIG. 5] of document U.S. Pat. No. 9,358,496 B2, which corresponds to an even more complex arrangement. An adsorber is made up of two modules connected in parallel by Y-shaped pipes. It will be noted that each module is made up of 4 sub-modules, themselves installed in parallel between an inlet pipe and an outlet pipe.

This results in a relatively high investment for this purification due to the volume of the enclosure and, when good distribution of the fluids is required through low-thickness beds, suitable devices to be provided. Therefore, there have been many developments that attempt to reduce this cost, in particular proposals for using atmospheric pressure purification units with different adsorber technology. Document US 2005/0217481 can be cited, for example, in the field of air purification, which document describes a system using technology that is made possible by the low pressure, that of the adsorbent wheels (Low Pressure Rotary Adsorbent Contactors). When seeking to achieve almost complete prevention of impurities (ultra-high purity), it is worthwhile using 3 devices in series.

One of the reasons for the need to multiply the number of wheels is due to the fact that the load of adsorbent in kg per m3 of constituent material of the wheel is low compared to that which is achieved in a conventional adsorber.

Still using the adsorbent wheel technology, it has been contemplated for a rotating system to be placed in series that is intended to remove a fraction of the impurities, followed by conventional purification for removing residual impurities. Document US 2017/0216760 then can be cited, which document, when applied to a VPSA, describes such a dual system.

Finally, there is currently no universal method for purifying or separating a high-flow gas stream at low pressure.

SUMMARY OF THE INVENTION

The present invention will then advantageously allow at least some of the purifications of this type to be covered.

One solution of the invention is an installation for purifying a gas stream by adsorption, comprising at least one adsorber A having a parallelepiped shaped enclosure arranged horizontally and comprising:
  an inlet and an outlet for the gas stream;
  two fixed-bed adsorbent masses, each of which is substantially parallelepiped shaped, the faces of which are parallel to the faces of the enclosure; and
  a set of volumes allowing the gas stream to horizontally pass through the gas stream, in parallel, in opposite directions, over the entire section of each of the adsorbent masses and over the entire thicknesses thereof;
the set of volumes comprising:
  a) an inner portion comprising:
  a first volume V1 for introducing and distributing or recovering fluids;
  a second volume V2 and a third volume V3, each comprising an adsorbent mass and being located on either side of the first volume V1; and
  b) a free portion comprising two free volumes V4 and V5 for introducing and distributing or recovering fluids included on either side of the inner portion and between the inner portion and the enclosure of the adsorber;
  the inner portion being arranged symmetrically in relation to the median plane of the enclosure of the adsorber;
  the inner portion having a solid lower base and/or a solid upper base and the first volume V1, the second volume V2 and the third volume V3 having vertical walls sealably attached to the upper wall of the enclosure of the adsorber or to the solid upper base and to the lower wall of the enclosure of the adsorber or to the solid lower base;

the set of volumes comprising, between the lower wall of the enclosure of the adsorber and the solid lower base, a space in fluid communication with the free volumes V4 and V5;

or, the set of volumes comprising, between the upper wall of the enclosure of the adsorber and the solid upper base, a space in fluid communication with the free volumes V4 and V5.

According to one embodiment, the second volume V2 and the third volume V3 each have a plurality of adsorbents and the vertical walls separating the different adsorbents are attached in the same manner to the upper wall of the enclosure of the adsorber or to the solid upper base and to the lower wall of the enclosure of the adsorber or to the solid lower base.

Throughout the remainder of the present application, L denotes the length of the adsorber A, H denotes its height and I denotes its width. The section of the adsorbent mass also uses L for the length and H for the height.

The term "fixed-beds" is understood herein to mean that the adsorbent, whether it is in the form of particles (beads, sticks, granules, platelets, etc.) or a structured adsorbent, such as, for example, a monolith, is immobile in an enclosure, which itself is immobile. The intention is to thereby exclude any solution where the adsorbent is movable, and in particular any rotating system of the wheel or barrel type (in which method it is the enclosures containing the adsorbent that are movable).

Another essential point according to the invention is the fact that the gas streams circulate horizontally through the adsorbent mass. This adsorbent mass thus can be maintained between two vertical gas-porous walls, for which the clearance tolerances can be very low. Thus, very thin and very homogeneous bed thicknesses can be obtained. As already stated, it is practically impossible to reach this level of precision with a flat adsorbent bed having a large free surface.

It also should be noted that the parallelepiped shape of the enclosure of the adsorber A enables dense and homogeneous filling of each adsorber, without having to use a complex filling system.

The installation according to the invention allows a gas stream with a high flow rate to be treated, and in an energy saving manner, since only very small pressure losses are induced.

Depending on the case, the installation according to the invention can have one or more of the following features:
the adsorbent masses follow a TSA or PSA cycle or are sacrificial load masses. The term "sacrificial load" means a load that has not been regenerated. In the case of sacrificial load adsorbent masses, reference will also be made to a guard bed;
the second volume V2 and the third volume V3 each comprise at least two adjacent sub-volumes comprising different adsorbents, with all the adsorbents arranged symmetrically in relation to the median plane of the adsorber.

Preferably, the different adsorbents are separated by vertical fluid-porous walls (H'*L').
the first volume V1, the second volume V2 and the third volume V3 have vertical walls sealably attached to at least one lateral wall of the enclosure of the adsorber;
the first volume V1, the second volume V2 and the third volume V3 have vertical walls sealably attached to at least one solid plate parallel to a lateral wall of the enclosure of the adsorber;

the set of volumes comprises, between the solid plate and a lateral wall of the enclosure of the adsorber, a space in fluid communication with the free volumes V4 and V5;
the second volume V2 and the third volume V3 containing the adsorbent mass comprise, along the entire length of their upper end, a system intended to avoid the local potential pollution of the purified gas associated with a bypass or with a local overflow or with a regeneration fault, if there is regeneration;
the enclosure of the adsorber A comprises means for introducing and/or extracting the different fluids circulating in the first volume V1, the free volumes V4 and V5, these means preferably will be located on the same face (H*1);
the first volume V1 comprises a filter for treating the purified stream, with this filter preferably being self-cleaning, i.e. being traversed in the counter-current direction by the regeneration gas, if there is regeneration gas;
the parallelepiped that forms the enclosure of the adsorber has a length that ranges between 3 and 12 meters, a height H that ranges between 1 and 3 meters and a width I that ranges between 1 and 3 meters;
the parallelepiped that forms the enclosure of the adsorber is contained in an ISO container or in a structure compliant with ISO standards relating to the containers and that comprises the gripping systems that also comply with these ISO standards;
at least one portion of the structure of the container is directly used as a structure for the adsorber.

It is to be noted that the installation according to the invention can comprise a plurality of adsorbers A operating in parallel.

The present invention also relates to a method for purifying a gas stream by adsorption implementing an installation according to the invention and comprising:
a step of purifying the gas stream by the parallel passage of said gas stream through the two adsorbent masses of the adsorber A; and
a step of regenerating the adsorber A by the parallel passage of a regeneration stream through the two adsorbent masses of the adsorber A; or
a step of replacing at least part of the two adsorbent masses of the adsorber A.

It is to be noted that "purification" particularly can be understood to mean the collection of a component such as $CO_2$ or rare gases.

The method of the invention implementing a single adsorber as described herein can, for example, allow the atmosphere of an essentially closed chamber to be maintained, in which at least one constituent X is produced, more or less continuously, the maximum acceptable content Ym of which can be relatively low (less than the %, for example) and should therefore be extracted from the system.

It can be related to said constituent X of the $CO_2$ exhaled through the breathing of a group of individuals, the enclosure then can be the inside of a submarine or a hermetically isolated shelter. It can involve fumes from paint, varnish, different coatings, the enclosure then can be a building having air recirculation. More generally, it can involve different discharges when the enclosure is basically closed (fruit storage warehouse, greenhouse, etc.). The basic solution is to purge, continuously or cyclically, so as to eliminate the constituent X toward the outside and thereby maintain an atmosphere for which the X content will be less than Ym. It will be appreciated that such a purge can be highly detrimental to the system in the case of a submarine or a space cabin, but it also can be difficult and expensive in many cases since it is accompanied by a loss of energy (heated or refrigerated enclosure) or of constituents intended to be retained in the enclosure (high CO2 content in certain greenhouses, additives promoting the preservation of products, etc.).

The solution according to the invention in these cases will involve circulating a fraction of the gas from the enclosure, generally air containing the constituent X to be discharged outside through the two adsorbent masses of the adsorber A. The retained adsorbent will be selective in relation to this impurity, for example, doped activated alumina if the intention is to remove CO2 from a humid atmosphere, silica gel or activated carbon if volatile organic compounds are involved. A simple fan will generally be used to circulate the fraction of gas to be purified, with the technology that is used thus making it possible to carry out this purification with a minimum pressure loss of the order of a few tens of millibars, or even less. In some cases, by virtue of the low resistance of the purification in relation to the passage of the fluid, the fan normally required to homogenize the atmosphere in the enclosure will be used to this end. This adsorption phase will continue until the adsorbent is loaded with the constituent X. For the contemplated applications, it is effectively possible to perforate the constituent X in the circulating gas, or even saturate the adsorbent. Once this state is obtained, a warm front is sent into the adsorbent, which will allow the constituent X to rapidly desorb. The fraction that is then produced is highly enriched with X, for instance on average 10 times more over the duration of this step, and discharged toward the outside. Through a simple review, it would appear that in this way only 10% of the gas will be lost with a simple purge to eliminate the same amount of undesirable product. The heating step can be carried out co-currently with the purification phase, allowing a very simple purification unit to be obtained comprising, in series, a fan (optionally the one used to homogenize the atmosphere or to draw atmospheric air in the event of a purge), a heating element during shutdown or in service (optionally that which will be used to maintain a certain temperature level in the enclosure), an adsorber according to the invention and, at the outlet, a device returning the fluid to the inside of the enclosure or to the external environment depending on the step of the method. The details of the implementation, and in particular the respective flow rates and durations during purification and discharging (heating), the adsorbent, the temperature level, etc., are dependent on the contemplated system and are to be adapted on a case-by-case basis.

More generally, the adsorber according to the invention can be used to divide a fluid at a pressure that is close to the atmospheric pressure, containing N constituents (N>1) A, B, C . . . N with respective contents Ya, Yb, Yc . . . Yn, into 2 or more fluids with respective contents Y1a, Y1b, Y1n . . . , Y2a, Y2b, Y2n, etc. successively obtained at the outlet of said adsorber by cyclically changing its inlet temperature (and optionally the flow rate of fluid at the inlet). Here again, the whole benefit of this application is due to the fact that, by virtue of the technology that is used that implements large flow sections and low thicknesses, the passage of the adsorbent masses, even at low pressure, is energy efficient for limited investment.

As appropriate, the method according to the invention can have one or more of the following features:

the purification step is carried out at a pressure ranging between 0.95 bar abs and 1.2 bar abs, preferably between 1.0 bar abs and 1.15 bar abs;

it implements an installation as previously defined and, in the purification step, the gas stream is introduced into the two free volumes V4 and V5 and the purified gas stream is drawn from the first volume V1;

it implements an installation as previously defined and, in the purification step, the gas stream is introduced into the space in fluid communication with the free volumes V4 and V5 and the purified gas stream is drawn from the first volume V1;

it implements an installation as previously defined and, in the regeneration step, the regeneration stream is introduced into the first volume V1 and then drawn into the two free volumes V4 and V5;

it implements an installation as previously defined and, in the regeneration step, the regeneration stream is introduced into the first volume V1 and then drawn into the space in fluid communication with the free volumes V4 and V5.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

Figure 1A:
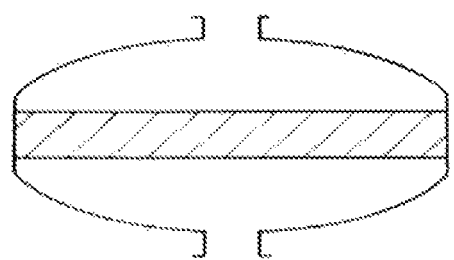
FIG. 1A shows an embodiment of the prior art.
Figure 1B:
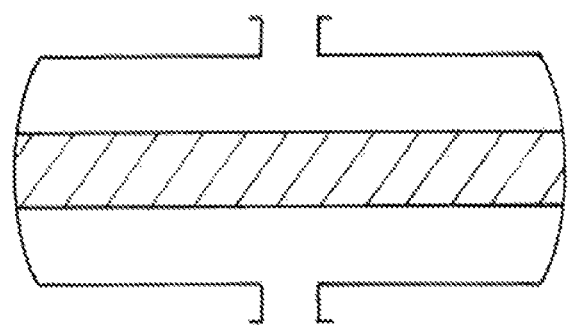
FIG. 1B shows an embodiment of the prior art.
Figure 2:
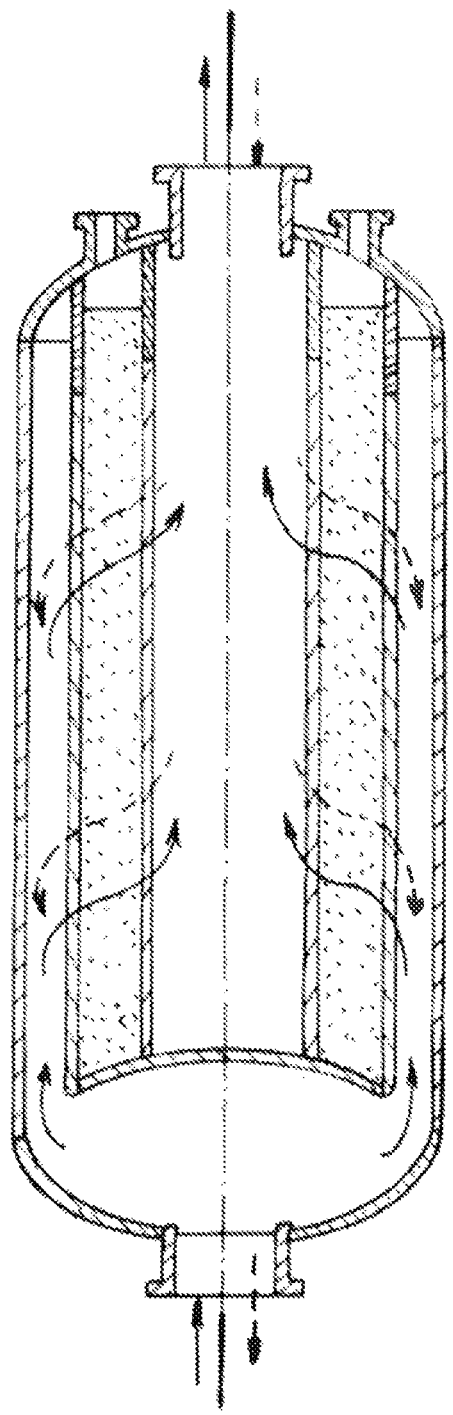
FIG. 2 shows an embodiment of the prior art.
Figure 3:
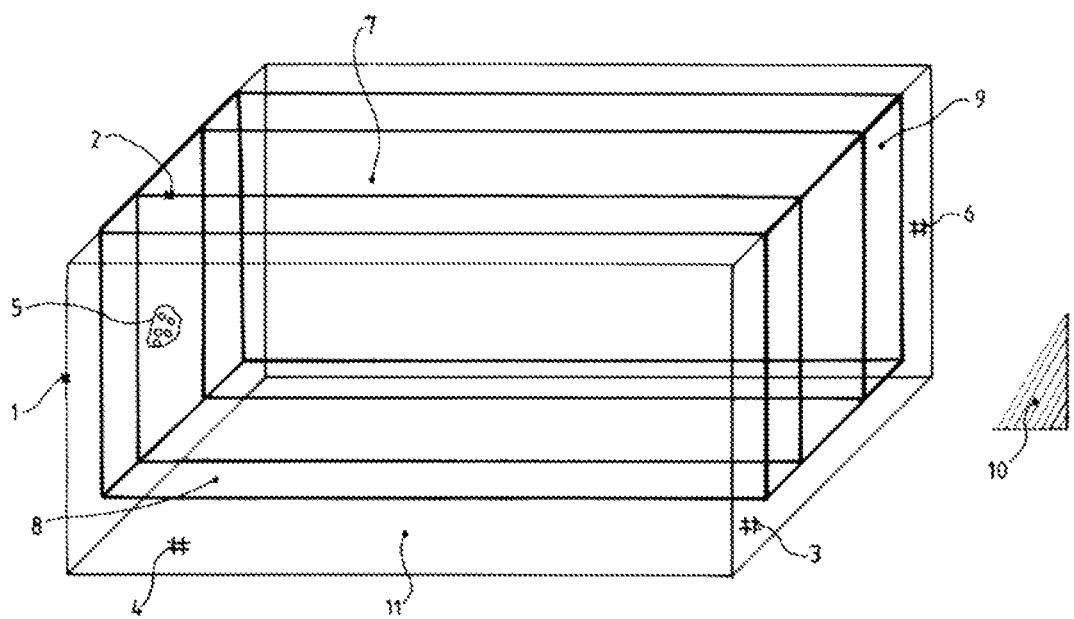
FIG. 3 illustrates an example of an arrangement of the different volumes in accordance with an embodiment of the invention.
Figure 4A:
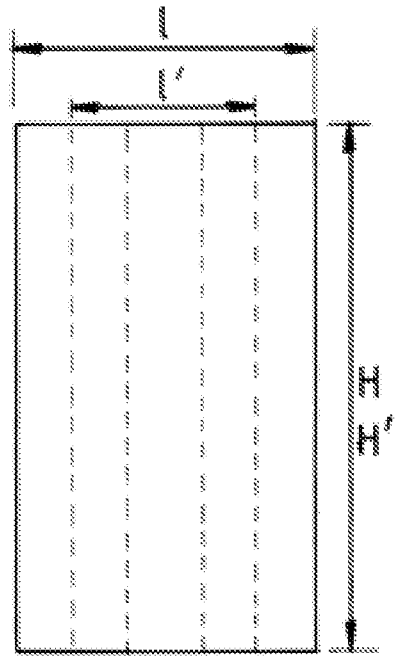
FIG. 4A provides a first schematic representation of an embodiment of the present invention.
Figure 4B:
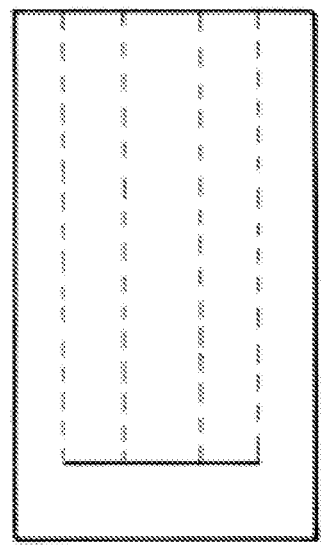
FIG. 4B provides a representation of an embodiment in which the adsorbent volumes are sealably attached at the top to the upper wall and at the bottom to a solid base, or floor.
Figure 4C:
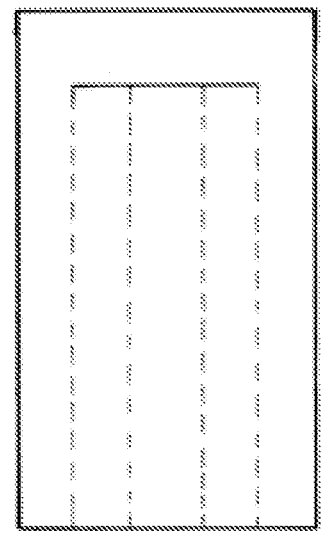
FIG. 4C provides an inverse configuration of FIG. 4b.
Figure 4D:
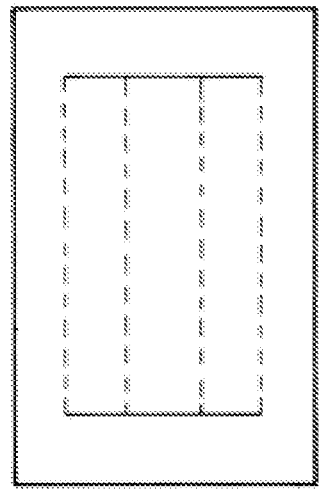
FIG. 4D provides a representation of an embodiment in which the adsorbent volumes are sealably attached at the top and bottom to solid bases.

FIG. 3 illustrates an example of an arrangement of the different volumes (free volumes, adsorbent volumes) according to the invention. The outer enclosure of the adsorber 1 has been shown using thin lines, while the inner portion 2, randomly, is shown using thick lines. "Basically the shape of a parallelepiped", is intended to mean that the enclosure of the adsorber and the inner portion in practice have six flat faces and have the appearance of a parallelepiped, with faces at right angles, but that there can be reinforcements, locally at least one layer of internal or external insulation, and obviously the pipes or boxes for introducing and withdrawing the gas to be purified and the regeneration gas. With the adsorber being laid flat on the ground in its operating position, L refers to its longest length, l refers to its width and H refers to its height. Within the scope of the invention, the fact that external or internal dimensions are involved is not important.

Therefore, each of the parallelepipeds that is implemented is defined using its 3 dimensions, namely $H*L*l$ for the outer enclosure of the adsorber and $H'*L'*l'$ for the inner portion. The horizontal, floor and ceiling faces are therefore identified using their dimensions $L*l$ and $L'*l'$ (reference sign 3, for example). The larger vertical faces are respectively identified as $H*L$ and $H'*L'$ (reference sign 4, for example). For the inner portion, these faces $H'*L'$ are fluid-porous (reference sign 5, for example). The other smaller vertical faces are then identified as $H*l$ and $H'*l'$ (reference sign 6, for example).

The parallelepiped $H'*L'*l'$ forming the inner portion itself is divided into 3 sub-volumes, all of parallelepiped shape. The central volume V1 7 is a free volume intended for circulating fluids. The adsorbent masses housed in the 2 parallelepipeds V2 and V3 8 and 9 are located on either side of V1. The inner portion is symmetrical in relation to its vertical median plane, which is schematically shown on the right-hand side of the drawing of the adsorber, reference sign 10. This median plane 10 is also the median plane of the enclosure of the adsorber. Therefore, it is the adsorber as a whole that has a plane of symmetry 10. Each of the adsorbent masses in this way will process 50% of the flow rate of gas to be purified and will be regenerated by 50% of the flow of regeneration gas, if there is regeneration gas (in the case of a TSA or a PSA). All the fluids circulate through the adsorbent horizontally via the faces $H'*L'$, which are the only porous faces. This circulation occurs from the central free volume V1 of the inner portion toward the free volumes V4 and V5 of the enclosure (reference sign 11, for example) and vice versa.

In the arrangement used in FIG. 3, the inner portion is the same length as the enclosure (L'=L), but is shorter (H'<H). The upper face of said inner portion is attached to the upper face of the enclosure, i.e. they have a common ceiling. Therefore, a space exists between the floor of the inner portion and that of the enclosure that fluidly connects the free volumes V4 and V5, with the whole then forming the free volume of the enclosure. This is one of the possible configurations between the enclosure and the inner portion. Other possibilities will be described hereafter. Therefore, [FIG. 3] is merely one non-limiting example of the possible configuration of the adsorber according to the invention selected to explain the implementation principle.

According to one variant, the second volume V2 and the third volume V3 of the inner portion each comprise a plurality N (with N ranging between 1 and 4, preferably N=2) of adjacent sub-volumes, with each of these volumes being able to contain an adsorbent with a different characteristic, with all these adsorbents being arranged symmetrically in relation to the median plane of the adsorber. Generally, the different adsorbents are separated by fluid-porous vertical walls (H' *L') that hold them and prevent them from mixing. It will be noted, however, that the different adsorbents can be installed with a movable wall that is progressively raised during filling and that is, as applicable, removed or ultimately left in place.

Assuming air purification, a first adsorbent will be used, for example, for removing the vast majority of the water and optionally some of the CO2 (activated alumina, silica gel, doped alumina, etc.) and a second adsorbent intended for removing the remaining CO2, nitrogen oxides and certain hydrocarbons (zeolites X, preferably exchanged, particularly with calcium and/or barium). A single bed (doped alumina, zeolite X) or 3 successive beds (for example, alumina, zeolite X, exchanged zeolite) equally can be used.

In a first configuration, schematically shown by the cross-section 4.A of [FIG. 4] (which is a side view of the adsorber vertically cut at its center), the adsorber is designed such that the vertical walls (H'*L') relating to the adsorbent volumes are sealably attached, at the top and at the bottom, respectively to the upper wall and to the lower wall of the enclosure of the adsorber. This configuration is simple and makes the assembly stiff, but it is then necessary to check whether the service conditions do not result in excessively high mechanical stresses. This will basically depend on the materials used, the type of fixing between walls and the temperature used during regeneration, if it is the case of a TSA method. This TSA method depends on the adsorbents that are used, the available regeneration rate, and the residual level of impurities in the adsorbent used for sizing. With a regeneration temperature of 60 to 90° C., for example, such a configuration can be possible. It will be less obvious to implement with temperatures of 150 to 250° C.

Conversely, this easy to implement simple solution advantageously can be retained in the case of a guard bed or a quasi-isobaric PSA that operate at a substantially constant temperature.

It will be noted that a single bed of adsorbent is shown for the sake of simplicity. In most cases, there will be at least one intermediate porous wall on each side intended to separate two or more distinct adsorbents.

For any potential temperature related problems, a degree of freedom may be needed to allow vertical movements on the porous vertical walls holding the adsorbents.

Thus, according to other embodiments, the adsorber is designed such that the vertical walls (H'*L') of the adsorbent volumes are sealably attached at the top to the upper wall of the enclosure of the adsorber and at the bottom to a solid base, or floor, proceeding from the outer wall of an adsorbent volume to the outer wall of the other volume, as shown in cross-section 4.B.

It then can be seen that there is a space between said solid base and the lower wall of the enclosure of the adsorber forming an additional free volume $V2c$ in fluid communication with the 2 lateral free volumes (V4 and V5) and helping to form the free volume of the adsorber.

In an inverse configuration (cross-section 4.C), the vertical walls (H'*L') of the adsorbent volumes are sealably attached at the top to a solid base, or ceiling, proceeding from the outer wall of an adsorbent volume to the outer wall of the other volume and at the bottom to the lower wall of the enclosure of the adsorber and there is then a space between said ceiling and the upper wall of the enclosure of the adsorber forming an additional free volume $V2d$ in fluid communication with the 2 lateral free volumes ($V4$ and $V5$) and helping to form the free volume of the adsorber.

Finally, according to another embodiment (4.D), the vertical walls (H' *L') of the adsorbent volumes are sealably attached at the top and at the bottom to solid bases, the ceiling and the floor, respectively, proceeding from the outer wall of an adsorbent volume to the outer wall of the other volume and at the bottom to the lower wall of the enclosure of the adsorber. In this case, there is a space between said ceiling and the upper wall of the enclosure of the adsorber and between said floor and the lower wall of this same enclosure forming an additional free volume in fluid communication with the 2 lateral free volumes ($V4$ and $V5$) and helping to form the free volume of the adsorber.

The mechanical strength of the inner portion in the enclosure can be improved by supports, for example, in the lower part, or suspension systems, for example, in the upper part. These retention means can have a certain degree of flexibility to accompany the possible movements related to the thermal expansions and contractions that have been previously mentioned. Said means preferably can be intermittent or, at least, discontinuous and not prevent the passage of fluids from one zone into the other.

Similarly, different configurations exist with respect to the lateral walls (H' *I') of the inner part.

According to a first embodiment, at least on one side, the lateral ends of the vertical walls of the adsorbent volumes are sealably attached over their entire height (H') to the lateral walls (H*I) of the enclosure of the adsorber.

According to a second embodiment, at least on one side, the lateral ends of the vertical walls of the adsorbent volumes are sealably attached over their entire height (H') to a solid plate (H' *I').

Figure 5A:
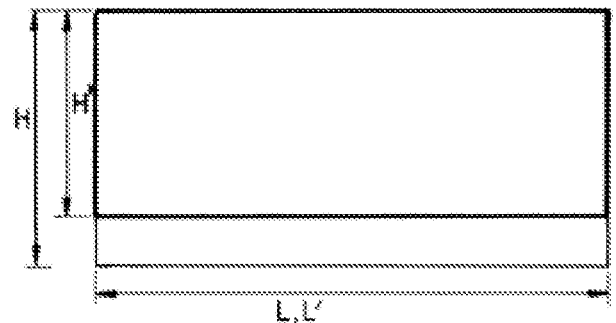
FIG. 5A shows an inner portion attached to the enclosure by its two lateral sides in accordance with an embodiment of the present invention.
Figure 5B:
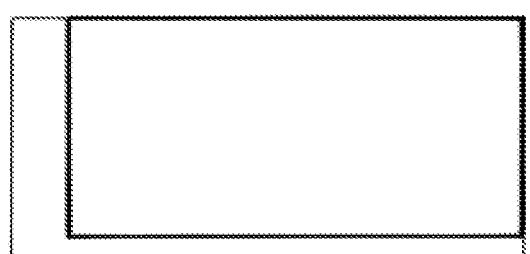
FIG. 5B shows an inner portion attached on one side, with the other side being closed by a flat base in accordance with an embodiment of the present invention.
Figure 5C:
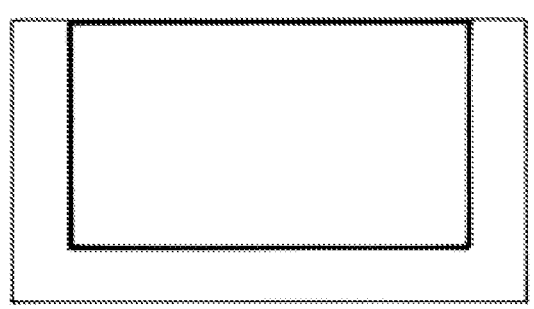
FIG. 5C shows an inner portion having two specific bases in accordance with an embodiment of the present invention.

A series of longitudinal cross-sections is schematically shown in [FIG. 5]. The inner portion randomly shown as a thick line is assumed to be attached to the enclosure at the upper part and to also have its own floor. The cross-section 5.A shows an inner portion attached to the enclosure by its two lateral sides, 5.B shows an inner portion attached on one side, with the other side being closed by a flat base and 5.C shows an inner portion having two specific bases.

As before, there is a space between each solid plate attached to the inner portion and the adjacent lateral wall of the enclosure of the adsorber forming an additional free volume in fluid communication with the 2 lateral free volumes ($V4$ and $V5$) and helping to form the free volume of the adsorber.

These free volumes allow fluids to circulate and promote a good balance between the flows going to each of the 2 adsorbent masses. In addition, these free volumes can allow highly efficient distribution systems to be accommodated, allowing almost perfect distribution of all the flows through the adsorbents. An example of this type of device will be provided hereafter.

According to a preferred variant, the volumes $V2$ and $V3$ containing the adsorbent mass comprise, over the entire length of their upper end, a system intended to avoid the local potential pollution of the purified fluid.

Indeed, with the circulation of the fluids being horizontal in the adsorbent masses, some of the constraints specific to the radial adsorbers are found, and in particular the fact that the premature penetration of impurities in the upper part of the adsorber needs to be avoided. Said penetration can originate from a bypass or from a local overflow of gas and/or from a regeneration fault.

For its part, the bypass can originate from the settling of the adsorbent. These problems are well known to a person skilled in the art and can be applied in this case to previously developed solutions. In particular, the use of a parallelepiped adsorber by its geometry simplifies the implementation of the solutions contemplated for the radial beds (dead zone filled with a sufficient height of adsorbent, system equivalent to cones, etc.). It should be noted again that filling is also simplified and that in this case it is easy to obtain dense and homogeneous rainfall filling limiting both settling and the risks of inhomogeneity of density in the beds. Due to the simple geometry, it will be possible, for example, to use an inflated balloon at a pressure greater than P1, forming a seal above the free surface of the adsorbents. It also can be a membrane permanently applied to the free surface of the adsorbents by a slight overpressure in relation to the operating pressure. This overpressure can originate from a fluid, for example, instrument air, or a heavy material. Here again, the solutions developed for the radial adsorbers of the oxygen production units by adsorption will need to be adapted and a description of which can be found in the literature or the filed patents.

In view of the geometry adopted for the adsorber, the method according to the invention will be such that, on the one hand, the central volume $V1$ of the inner portion and, on the other hand, the free volume of the enclosure, made up of $V4$ and $V5$, have means for introducing and extracting the different fluids circulating in the adsorber (gas to be purified, treated gas intended for the cryogenic separation unit, regeneration gas originating from this same unit, most generally low-pressure nitrogen).

More specifically, the arrangement of the inner portion in the enclosure with its optional flat bases, and the arrangement of the means for introducing and extracting the different fluids circulating in the adsorber, means that the circulation of said fluids between the inlet and the outlet of said adsorber only occurs through the adsorbent masses, and does so in a horizontal manner.

As in all adsorbers that must remove practically all the impurities from a fluid, it must be ensured that the connections between elements are fluid-tight by adopting the appropriate technologies (welding, flanges, seals, etc.).

According to a preferred arrangement, the flow to be treated enters via the volumes $V4$ and $V5$ and, once purified, exits via the volume $V1$ and, therefore, in the TSA type operation, the regeneration gas generally enters via the volume $V1$ and exits via the volumes $V4$ and $V5$. The advantage of this arrangement stems from the TSA method as currently implemented at least in the air purification units upstream of the cryogenic separation units. Without going into details here, it must be understood that in this type of unit, it is common practice, during the regeneration, to only enter the amount of heat that is strictly necessary for the desorption of the impurities so that the warm front does not leave the adsorbent. For example, reference can be made to document EP 1080773 to this end for fuller explanations of the regulation of the heating time. This means that all (or practically all) the outer enclosure remains at a temperature that is close to that of the incoming gas and that only the inner portion experiences the warm front. In the configurations where one face of the inner portion is attached to the wall of the enclosure or is very close thereto, it can be worthwhile, in order to limit the thermal transfers, to use an insulation means. Said insulation means can be on the inner portion side and/or on the enclosure side and/or optionally between the inner portion and the enclosure. Such insulation will not always be necessary, particularly if a significant flow of regeneration gas is available. A regeneration temperature that is substantially less than 100° C., of the order of 50 to 80° C., will then be acceptable. In this case, the thermal losses will be naturally low and the thermal stresses will be related to the limited expansions. Conversely, the use of regeneration temperatures of 150° C. and above will lead to a more detailed study of the resulting constraints. Depending on the location of the inlet of the gas to be purified, and in particular if said gas has been substantially cooled to facilitate the adsorption of the impurities, it may be necessary to insulate certain parts of the adsorber in order to maintain this advantage.

According to a preferred variant, the central volume V1 of the inner portion comprises a filter allowing the purified gas to be treated before directing it toward the downstream unit. This filter preferably will be self-cleaning, i.e. it will be traversed in the counter-current direction by the regeneration gas (CAS, PSA cases), which will remove any dust that may have been stopped during the previous step. A purge then generally exists at a low point for periodically discharging said dust. This filter can be made in many ways. By using the arrangement of [FIG. 5B], [FIG. 6] shows some of these possibilities.

It shows cross-sections at the level of the median plane of symmetry of the adsorber. Reference sign 20 corresponds to the enclosure, 21 corresponds to the inner portion, 22 corresponds to the outlet pipe of the purified gas and to the inlet of the regeneration gas, 23 corresponds to the part of this pipe that sealably passes through the free volume of the enclosure, 24 corresponds to the part of this pipe belonging to the inner portion and 25 corresponds to the one or more filtration zone(s).

The pipe and filter have been shown using thick lines. The section of the pipe can assume any shape (round, triangular, rectangular, etc.).

Figure 6A:
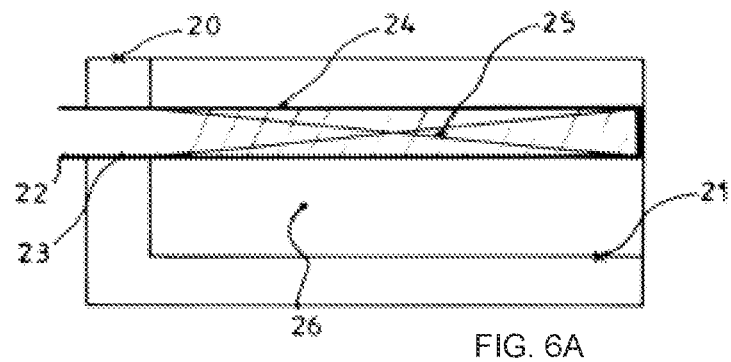
FIG. 6A provides a first option for producing a filter in accordance with an embodiments of the present invention.

In [FIG. 6A], it is the pipe itself that passes through the free volume V1 26 that acts as a filter. In this zone, it is perforated, for example, and surrounded by a fabric allowing 50 micron filtration. It also can be a commercial filter attached in the extension of the pipe, which then stops as it opens into the volume V1. The pipe, or the commercially available filter, can have a conical internal lining to better distribute the fluids along their entire length.

Figure 6B:
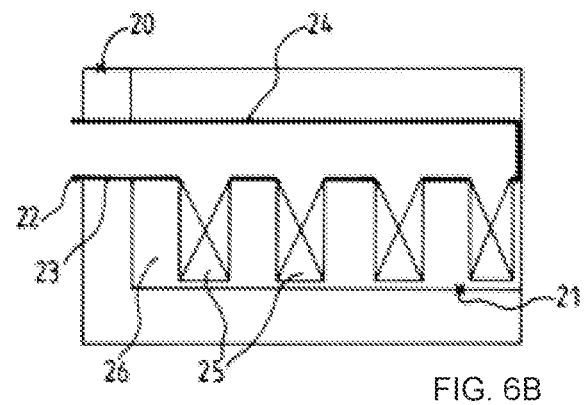
FIG. 6B provides a second option for producing a filter in accordance with an embodiment of the present invention.
Figure 6C:
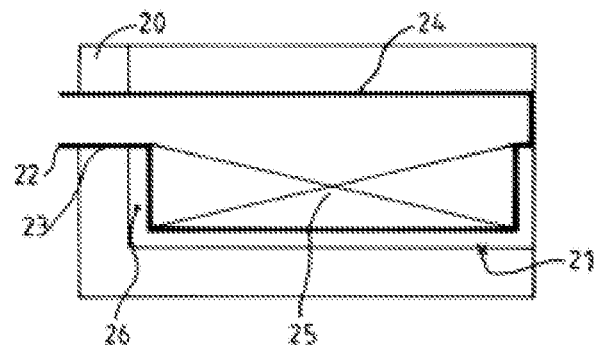
FIG. 6C provides a third option for producing a filter in accordance with an embodiment of the present invention.

In the case of [FIG. 6B], a plurality of commercially available filters (25) is used that are attached to the pipe 24. This can allow the distribution of fluids through the adsorbent masses to be improved by distributing the injection points of the fluids in the free volume V1. At the end of [FIG. 6C], an efficient fluid distribution system is associated with filtration. It will be noted that such a distribution system can be installed independently of the filtration function. It can involve 2 perforated walls installed on either side of the median vertical plane, in the free volume V1 and at a certain distance from the porous walls holding the adsorbent. By creating an additional pressure loss, this system can allow almost perfect distribution of the gas in the adsorbent masses. It is used in the example used at the end of the document.

In a more preferred configuration, the means for introducing and extracting the fluids from the volumes V1, V4 and V5 are on the same face (H*I) of the parallelepiped enclosure of the adsorber. This allows all the inlets and outlets of the adsorber to be consolidated in order to facilitate the connections with the equipment outside the adsorber itself (valves, exchanger, etc.).

Figure 7A:
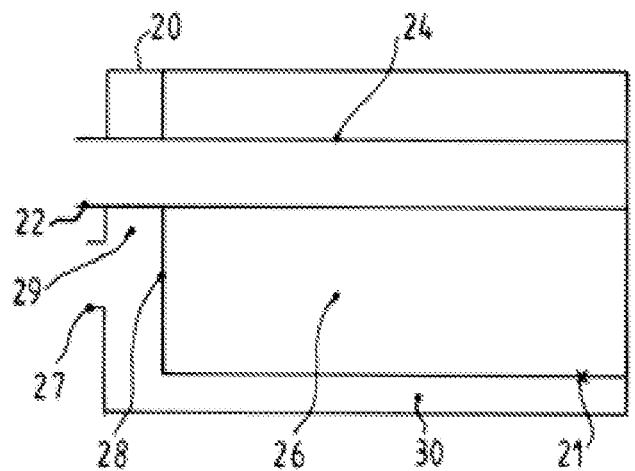
FIG. 7A provides an embodiment of the present invention in which a simple pipe penetrates the free volume.
Figure 7B:
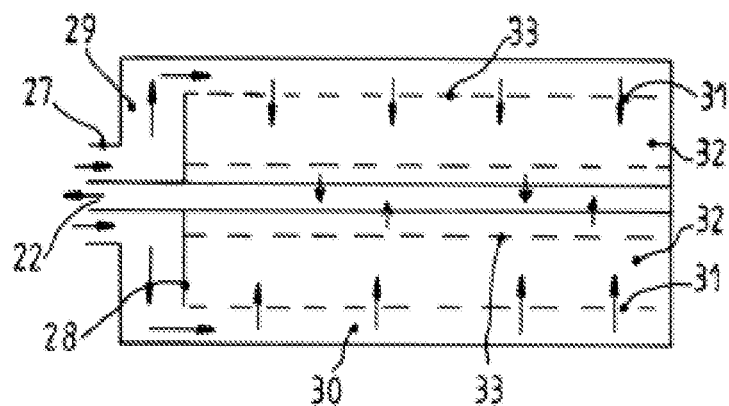
FIG. 7B provides a top view and illustrates the circulation of fluids in the adsorber.

FIG. 7 illustrates such a layout. Again, the arrangement of [FIG. 5.B] is used, namely an inner portion attached to the enclosure via its upper face and via one side, with a simple pipe penetrating the free volume V1, as shown in 6.a. The same reference signs as in this cross-section are used. On the cross-section 7.A along the vertical median plane of the adsorber, the flow to be purified arrives via the pipe 27, then enters the enclosure of the adsorber. The base 28 of the inner portion acts as a deflector and distributes the flow of gas into the free volume 29 included between the wall of the enclosure and said base. [FIG. 7.B] schematically shows a top view and illustrates the circulation of fluids in the adsorber. After having circulated into the free volume 29, the gas to be purified enters the 2 free volumes V4 and V5 marked 30, passes through the porous support walls of the adsorbent, and then the adsorbent masses, then exits through the central porous walls, enters the discharge pipe and exits the adsorber 22.

Given the low pressures involved in the purification, and in some cases temperatures that remain close to ambient temperature, the materials used for TSA can be varied. It will basically involve metal materials (carbon steel, stainless steel, aluminum, etc.) and/or polymeric materials. In some parts, low thermal expansion materials, such as INVAR, can be used. Construction will occur entirely in a workshop, only the connections of the different fluids will be made on site. The adsorbents preferably also will be filled in the workshop.

Such an adsorber can contain up to approximately 50 m3 of adsorbent. From a hydraulic point of view, the flow section reserved for gas allows between approximately 20,000 and 100,000 Nm3/h to be treated according to the characteristics of the adsorbents that are used (shape, equivalent diameter, void ratio, etc.) and the allowable pressure losses. For some applications, such as CO2 capture, it is contemplated for substantially higher volumes of adsorbent to be implemented and for higher flows to be treated. Rather than using a larger adsorber that is difficult to transport, it will be preferable for a plurality of adsorbers according to the invention to be implemented. These adsorbers can operate in parallel following a conventional TSA cycle (for example, 6 in adsorption and 6 in regeneration) or in a more complex manner, so as to always have, for example, an adsorber in the heating phase.

The following example will illustrate the invention as described above. Reference will be made to a large adsorber the intention of which was to maximize the volume of adsorbent using inlet and outlet gas distribution devices to, by contrast, reduce the volume required for good distribution of the fluid through the adsorbent mass.

It relates to a guard bed intended to particularly stop small traces of heavy hydrocarbides, such as cyclic compounds, in a flow of carbon dioxide that can reach a few tens of thousands of Nm3/h. The pressure is of the order of 1.15 bar abs. The adsorbent used is rod-shaped activated carbon. In order to minimize the pressure losses and to maximize the operating duration per adsorbent load, the largest adsorber according to the invention is used, i.e. still compatible with the large ISO container. By way of a reminder, in this case there is no regeneration in situ and the polluted load is periodically replaced by a new load.

Figure 8:
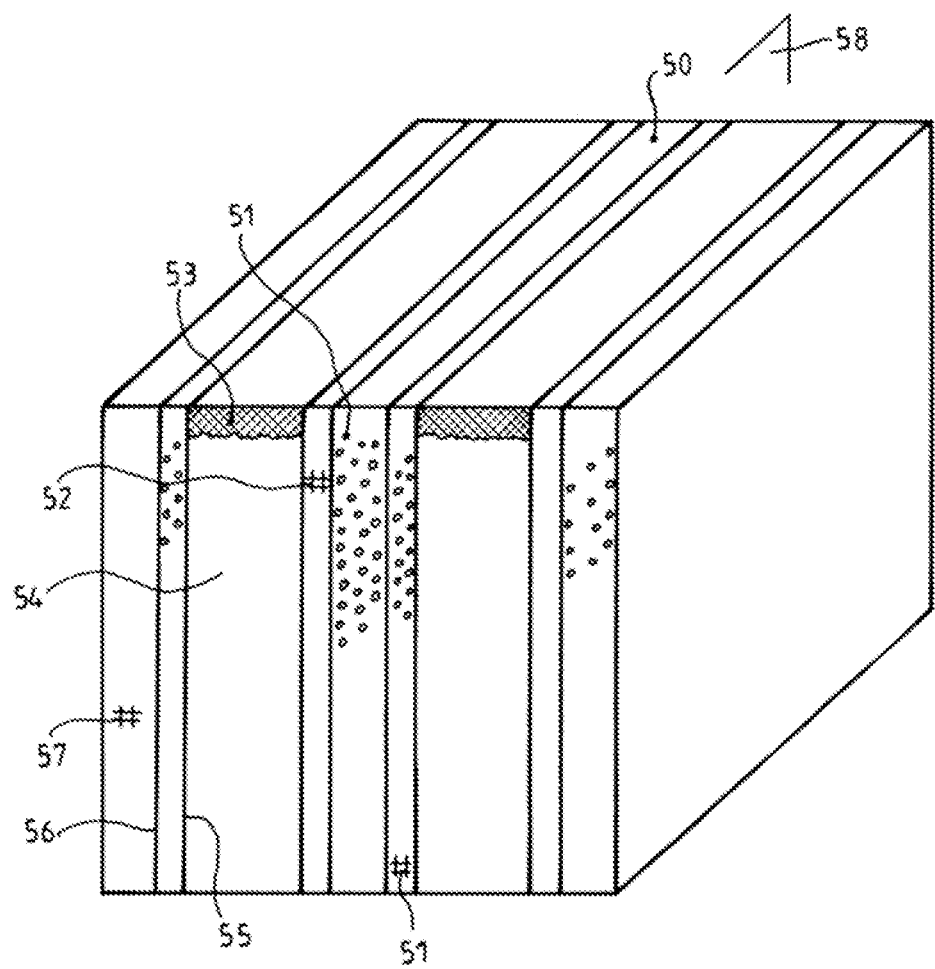
FIG. 8 provides a perspective cross-sectional view of an embodiment of the present invention.

According to the invention, the adsorber is in the form of a parallelepiped of length L equal to approximately 12 m, of height H equal to approximately 3 m, and of width I equal to approximately 3.00 m. [FIG. 8] shows a perspective cross-section of said adsorber. The volume V1 intended for distributing the fluids 50 is located at the center.

This volume itself is divided into 3 sub-volumes separated by a perforated wall 51 on either side of the central zone. These perforated walls allow the gas stream to be distributed over the entire length and height of the porous wall 52 holding the adsorbent. They are placed within a few centimeters of the porous walls in order to allow the gas veins to spread before entering the adsorbent. A sealing system 53 permanently bearing on the adsorbent avoids the bypasses in the upper part due to possible settling of the adsorbent. The adsorbent mass 54 is held in place on the outer side by the porous wall 55. A perforated wall 56 is used for the proper distribution of the gas stream. The gas then circulates into the free volume included between said perforated wall 56 and the wall of the enclosure 57 of the adsorber. In practice, the circulation of the flows is symmetrical in relation to the median plane of the adsorber 58.

The useful height of adsorbent is 2.5 m. The width of each bed is approximately 0.9 m. The total volume of adsorbent is of the order of 54 m3. A solid wall, not shown, needs to be visualized at the ends of the central portion, which wall isolates said inner portion from the free volume of the outer enclosure. The entry of the impure CO2 and the discharge of the purified CO2 occurs as described above, in particular in FIGS. 6 and 7.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. An installation for purifying a gas stream by adsorption, comprising at least one adsorber A having a parallelepiped shaped enclosure arranged horizontally and comprising:
   an inlet and an outlet for the gas stream;
   two fixed-bed adsorbent masses, each of which is also parallelepiped shaped, faces of which are parallel to faces of the enclosure; and
   a set of volumes allowing the gas stream to horizontally pass through the two adsorbent masses, in parallel, in opposite directions, over the entire section of each of the adsorbent masses and over the entire thicknesses thereof;
   the set of volumes comprising:
   a) an inner portion comprising:
      a first volume V1 for introducing and distributing or recovering fluids;
      a second volume V2 and a third volume V3, each comprising an adsorbent mass and being located on either side of the first volume V1; and
   b) a free portion comprising two free volumes V4 and V5 for introducing and distributing or recovering fluids included on either side of the inner portion and between the inner portion and the enclosure of the adsorber;
   the inner portion being arranged symmetrically in relation to the median plane of the enclosure of the adsorber;
   the inner portion having a solid lower base and/or a solid upper base and the first volume V1, the second volume V2 and the third volume V3 having vertical walls sealably attached to the upper wall of the enclosure of the adsorber or to the solid upper base and to the lower wall of the enclosure of the adsorber or to the solid lower base;
   the set of volumes comprising, between the lower wall of the enclosure of the adsorber and the solid lower base, a space in fluid communication with the free volumes V4 and V5;
   or,
   the set of volumes comprising, between the upper wall of the enclosure of the adsorber and the solid upper base, a space in fluid communication with the free volumes V4 and V5.

2. The installation as claimed in claim 1, wherein the adsorbent masses follow a TSA or PSA cycle or are sacrificial load masses.

3. The installation as claimed in claim 1, wherein the second volume V2 and the third volume V3 each comprise at least two adjacent sub-volumes comprising different adsorbents, with the set of adsorbents being arranged symmetrically in relation to the median plane of the adsorber.

4. The installation as claimed in claim 1, wherein the first volume V1, the second volume V2 and the third volume V3 have vertical walls sealably attached to at least one lateral wall of the enclosure of the adsorber.

5. The installation as claimed in claim 1, wherein the first volume V1, the second volume V2 and the third volume V3 have vertical walls sealably attached to at least one solid plate parallel to a lateral wall of the enclosure of the adsorber.

6. The installation as claimed in claim 5, wherein the set of volumes comprises, between the at least one solid plate and a lateral wall of the enclosure of the adsorber, a space in fluid communication with the free volumes V4 and V5.

7. A method for purifying a gas stream by adsorption implementing an installation as defined in claim 1, the method comprising: a step of purifying the gas stream by the parallel passage of said gas stream through the two adsorbent masses of the adsorber A; and a step selected from the group consisting of:
  i. a step of regenerating the adsorber A by the parallel passage of a regeneration stream through the two adsorbent masses of the adsorber A; and
  ii. a step of replacing at least part of the two adsorbent masses of the adsorber A.

8. The method as claimed in claim 7, wherein the purification step is carried out at a pressure ranging between 0.95 bar abs and 1.2 bar abs.

9. The method as claimed in claim 7, wherein the purification step is carried out at a pressure ranging between 1.0 bar abs and 1.15 bar abs.

10. The method as claimed in claim 7, wherein the method implements an installation as defined in claim 1 and, in the purification step, the gas stream is introduced into the two free volumes V4 and V5 and the purified gas stream is drawn from the first volume V1.

11. The method as claimed in claim 7, wherein the method implements an installation as defined in claim 1 and, in the purification step, the gas stream is introduced into the space in fluid communication with the free volumes V4 and V5 and the purified gas stream is drawn from the first volume V1.

12. The method as claimed in claim 7, wherein the method implements an installation as defined in claim 1, and, in the regeneration step, the regeneration stream is introduced into the first volume V1 and then drawn into the two free volumes V4 and V5.

13. The method as claimed in claim 8, wherein the method implements an installation as defined in claim 1, and, in the regeneration step, the regeneration stream is introduced into the first volume V1 and then drawn into the space in fluid communication with the free volumes V4 and V5.

14. The method as claimed in claim 9, wherein the method implements an installation as defined in claim 1, and, in the regeneration step, the regeneration stream is introduced into the first volume V1 and then drawn into the space in fluid communication with the free volumes V4 and V5.

15. The method as claimed in claim 11, wherein the method implements an installation as defined in claim 1, and, in the regeneration step, the regeneration stream is introduced into the first volume V1 and then drawn into the space in fluid communication with the free volumes V4 and V5.

* * * * *